UNITED STATES PATENT OFFICE 2,677,649

PROCESS AND CATALYSTS FOR PETROLEUM CONVERSIONS

Isidor Kirshenbaum, Rahway, and George R. Gilbert, Elizabeth, N. J., assignors to Standard Oil Development Company, a corporation of Delaware No Drawing. Application November 18, 1949, Serial No. 128,257

8 Claims. (Cl. 196—50)

The present invention relates to improvements in the manufacture of catalysts, especially those employed in the conversion of hydrocarbons, and more particularly, it relates to improvements in the manufacture of catalysts useful in reforming of naphthas, aromatizing aliphatic hydrocarbons, dehydrogenation of hydrocarbons, desulfurization of naphthas, and/or synthesis, hydrogenation, oxidation and dehydrogenation reactions.

It is known that petroleum naphthas can be subjected to a so-called reforming operation to yield a liquid product boiling within the gasoline range and possessing improved octane numbers. Catalytic reforming operations such as hydroforming, aromatization, dehydrogenation, hydrocracking, etc., are widely used in the petroleum industry. By hydroforming is ordinarily meant an operation conducted at elevated temperatures and pressures in the presence of a solid catalyst and added hydrogen, wherein a hydrocarbon fraction is increased in aromaticity and wherein there is no net consumption of hydrogen. The term "aromatization" refers to an operation in which a hydrocarbon fraction is treated at elevated temperatures in the presence of a solid catalyst, for the purpose of increasing the aromaticity of the hydrocarbon fraction. Aromatization is carried out at a pressure lower than that employed in hydroforming, for example, from 1 to 10 atmospheres, in the presence or absence of added hydrogen.

Catalytic reforming operations are usually carried out at temperatures of around 750 to 1100° F. in the presence of such catalysts as molybdenum oxide, chromium oxide, nickel sulfide, or tungsten sulfide, or any of a number of oxides or sulfides of metals of groups I, II, IV, V, VI, VII, VIII of the periodic system. These catalysts are usually supported on a base or spacing agent. A commonly used base or spacing agent is alumina, either of the gel type or precipitated alumina. For example, a good catalyst for reforming or hydroforming is one containing about 10% molybdenum oxide supported on an alumina base prepared by heat treating hydrated aluminum oxide. A good catalyst for dehydrogenation is one containing copper or nickel oxide on an aluminum oxide base. However, alumina in its various forms is not heat stable particularly at regeneration temperatures which are of the order of 1000 to 1200° F. At temperatures of 1100° F. or higher, alumina is definitely impaired by prolonged heating, and this impairment is reflected in the loss of activity of the catalyst composition of which the alumina is the support or spacing agent.

It has been found that alumina may be treated to increase its heat resistance so that it may act more efficiently as a support for high temperature catalytic processes, and will have a high degree of activity under the most severe temperature conditions for an extended period of time. It has been proposed to prepare such heat stable catalyst bases or supports by combining aluminum oxide with zinc oxide, preferably in molecular proportions, thereby forming zinc aluminate. This combination forms a true chemical compound of the spinel type and is not a mere mechanical mixture as shown by examination of the lattice spacing in accordance with the well known procedure of X-ray diffraction. Such zinc aluminate spinels are not only more heat stable than ordinary alumina but they also form more active catalyst compositions when such compounds as molybdenum oxide or chromium oxide are deposited thereon than when the same catalytic metal oxide is deposited in the same amounts upon an alumina support.

Zinc aluminate spinel bases or supports have ordinarily been prepared by reacting aqueous solutions of the metal salts with basic solutions such as ammonium hydroxide or sodium hydroxide or, in some cases by using the sodium metallate and a salt of the other metal, for example sodium aluminate and zinc sulfate, nitrate or chloride. The precipitate is washed, impregnated with other materials if desired, dried and calcined.

A disadvantage of these zinc aluminate spinels has been their relatively high cost which may be attributed to the fact that expensive metal salts of a high degree of purity are required for their manufacture. A further difficulty that has been encountered in the preparation of these catalysts from mixed starting salts such as $ZnSO_4$ and $Al_2SO_4$, is the removal of anion and cation contaminants which may have detrimental effects on the usefulnes of such catalysts and catalyst supports. Similar difficulties are also encountered in the preparation of catalysts containing copper, nickel, cobalt, silver, gold, platinum, palladium, cadmium, iron and similar catalytically active components.

It is the object of this invention to provide the art with a novel method of preparing catalytically active compositions.

It is a further object of this invention to provide a novel method of preparing catalytically active compositions containing at most only minute amounts of anion and cation contaminants.

It is another object of this invention to provide a novel method of preparing zinc aluminate spinels containing at most only minute amounts of anion and cation contaminants.

It is also an object of this invention to prepare reforming catalysts of improved activity using zinc aluminate spinel bases prepared in a novel manner.

These and other objects will appear more clearly from the detailed specification and claims which follow.

It has now been found that the difficulties of removing anion and cation contaminants which have detrimental effects upon the activity and usefulness of catalysts can be avoided or minimized by treating a catalytic metal oxide or hydroxide with a nitrogen-containing base such as ammonia, amines and the like to form the corresponding metal-ammonium or metal-amine complex ion. The principle involved depends upon the solubility of the metallic oxides or hydroxides in ammoniacal or similar solutions via the formation of complex ammonium or similar ions. This new method of preparation gives catalysts having lower concentrations of contaminants, high activities and lower carbon forming tendencies than catalysts prepared by the conventional methods. In accordance with a preferred embodiment, the desired metal hydroxides can be prepared by treating metal salts such as acetates, formates, or nitrates in which the anion is readily decomposed by heat, with ammonium hydroxide. Mixtures of complex-forming compounds can, of course, be employed.

In carrying out the invention the complex-forming metal, preferably in the form of the hydroxide, may first be combined with aqueous ammonium hydroxide. To the resulting solution or slurry is then added the oxide or hydroxide of one or more other metals, which serve as spacing agents. The spacing agents may have, and often do have, catalytic activity. For example, zinc hydroxide may be combined with ammonium hydroxide, and aluminum hydroxide then added. If desired, an additional catalytic material such as tungstic oxide or ammonium molybdate or vanadate may also be added. The mixture is then subjected to moderate heating to drive off the ammonia and water, and generally to more severe heating in order to improve properties such as activity, strength and life.

Alternatively, the oxides or hydroxides of the complex-forming metal and of the spacing agent metal can merely be slurried with ammonium hydroxide or other complex forming intermediate and the mixture subjected to the usual heat finishing steps.

In a modification, which offers some advantage in the quantity of ammonia required, the metal-ammonium complex solution is mixed with a salt of the spacing agent metal. In this case, the complex itself serves as a precipitant of the spacing agent metal oxide or hydroxide. Of course, additional ammonium hydroxide may be added if desired. When employing this modification, it is highly desirable that the salt anion be readily decomposable by heat, carbonates, nitrates, formates, acetates and the like being suitable.

Among the complex-forming metals which may be employed in preparing catalysts by the improved method of this invention may be mentioned zinc, copper, cobalt, nickel, chromium, silver, platinum, palladium and cadmium.

Compounds which may be used as the source of the spacing agent are the oxide, hydroxide, sulfate or chloride, or preferably the nitrate, acetate, carbonate or other salts having anions that are readily decomposable by heat. These may be compounds of aluminum, as indicated above, or of silicon, magnesium or silica-alumina, zirconia-alumina, zirconia-silica, magnesia-silica, activated carbon, clay such as kieselguhr, bauxite, etc.

It will be understood that more than one type of spacing agent may be incorporated in the catalyst. Materials such as activated alumina, silica gel, silica-alumina gel, active carbon, clays such as kieselguhr, and magnesia may be added at any suitable stage in the manufacture. For example, a mixture of the complex-forming metal oxide, ammonium hydroxide solution and a spacing agent compound such as aluminum hydroxide, together with ammonium molybdate if desired, can be mulled with 10 to 90% of a catalyst base such as silica gel, followed by the usual heat finishing steps.

The quantity of ammonia to be employed is preferably equal to the chemical equivalent to form the complex ion, for example, $CO(NH_3)_6^{+++}$, $CO(NH_3)_4^{++}$, $Zn(NH_3)_4^{++}$ and $Ag(NH_3)_2^+$. A complex forming intermediate such as an amine, as for example pyridine, urea or antipyrine, may often be used instead of the ammonia. In this case, complexes such as $Zn(C_5H_5N)_4^{++}$ or $Ni(C_5H_5N)_4^{++}$ are formed using pyridine as the complex intermediate; such as $Cr(CON_2H_4)_6^{+++}$ when using urea; or such as $Y(C_{11}H_{12}N_2O)_6^{+++}$ when using antipyrine as the complex intermediate. More or less than the theoretical amount of the complex forming intermediate can be used, depending upon the slurrying characteristics of the wet catalyst. The temperature at which the complex ions are formed is ordinarily ambient temperatures; however, either higher or lower temperatures can be used. If too high a temperature is used excessive loss of the complex forming intermediate will occur during catalyst preparation.

The following examples are illustrative of the advantages that may be gained by preparation of catalysts in accordance with the present invention.

EXAMPLE I

In the preparation of a catalyst illustrating the invention, $Zn(OH)_2$ was precipitated from a $ZnSO_4$ solution, by using $NH_4OH$, at a pH of 6.5 and then washed free of sulfate contamination. Aluminum hydroxide was precipitated at a pH of 8.5 from an $Al_2(SO_4)_3$ solution, using $NH_4OH$, washed and peptized with acetic acid. The hydroxides were mixed with ammonium hydroxide solution and ammonium molybdate. The ammonium hydroxide and water were driven off by heating at 250° F. overnight and calcining for 3 hours at 1200° F. The mass was pulverized and pilled to give a catalyst of the following composition: 87.6% $ZnO.Al_2O_3$ and 12.4% $MoO_3$. This catalyst is designated as catalyst A below.

In the preparation of a catalyst by a prior art method, a solution of the nitrates of zinc and aluminum was reacted with ammonium hydroxide to co-precipitate zinc and aluminum hydroxides. The precipitate was washed, dried at 250° F., pulverized, impregnated with an ammoniacal solution of ammonium molybdate, dried at 250° F., calcined at 1200° F. and pilled. This catalyst contained, in parts by weight, the equivalent of 89.6 zinc aluminate and 10.4 molybdenum oxide. This catalyst is designated as catalyst B below.

Another prior art catalyst containing 89.0% zinc aluminate and 11.0% molybdenum oxide was prepared according to Example 1 of U. S. Patent No. 2,447,016 using sodium aluminate, zinc sulfate and ammonium molybdate. This catalyst is designated as catalyst C below.

These catalysts were tested in a standard fixed bed testing unit and gave the results shown in the following tables.

TABLE I

*Activity of zinc aluminate base catalysts*

[n=Heptane feed    1000° F.    0 p. s. i. g.]

| Catalyst | Method of Preparation | Relative Activity [1] |
|---|---|---|
| A | $Zn(OH)_2$—$NH_3$ complex + $Al_2O_3.XH_2O$ (from sulfate) (as per this invention). | 113 |
| B | $Zn(NO_3)_2$ + $Al(NO_3)_3$ coprecipitated with $NH_4OH$. | 100 |
| C | $ZnSO_4$ + $NaAlO_2$ standard preparation as per Kearby Patent 2,447,016. | 86 |

[1] Relative activity is proportional to the feed rate required to obtain a given yield of aromatics from n-heptane at 1000° F. A yield of 45 vol. percent aromatics was used as basis for 0 p. s. i. g. tests.

TABLE II

*Carbon selectivity at 82% conversion level*

[n=Heptane feed    1000° F.    9 p. s. i. g.]

| Catalyst | Method of Preparation | Carbon Selectivity [1] |
|---|---|---|
| A | $Zn(OH)_2$—$NH_3$ complex + $Al_2O_3.XH_2O$ (from sulfate) (as per this invention). | 6.8 |
| B | $Zn(NO_3)_2$ + $Al(NO_3)_3$ coprecipitated with $NH_4OH$. | 9.2 |
| C | $ZnSO_4$ + $NaAlO_2$, standard preparation as per Kearby Patent 2,447,016. | 7.6 |

[1] Carbon selectivity varies with conversion level and is defined as the ratio $$\frac{\text{Percent n-heptane to carbon}}{\text{Percent n-heptane converted}}$$

It is seen that the catalyst A, prepared according to the present invention, in addition to having a higher activity shows a significantly lower carbon selectivity.

EXAMPLE II

A catalyst was prepared by slurrying commercial zinc oxide with concentrated ammonium hydroxide, equivalent to that contained in the zinc-ammonium ion complex, and then mixed with hydrous aluminum hydroxide, made from aluminum sulfate and ammonium hydroxide as in Example 1. Ammoniacal ammonium molybdate was added to this and the catalyst finished as described above. This catalyst had a relative activity of 86 and a carbon selectivity of 6.5. The sulfate content of this catalyst, prepared via this ammonium complex ion method, was 0.56 wt. per cent. The sulfate content of catalyst C of Example 1, which was prepared according to Example 1 of U. S. Patent No. 2,447,016 was 3.8 wt. per cent.

In the preparation of the zinc aluminate base the examples shown contained equimolar proportions of zinc oxide and alumina. However satisfactory catalysts may be prepared with the other proportion of the zinc and aluminum oxides. A preferable range is that in which the $Al_2O_3/ZnO$ molar ratio is between about 0.5 and 2.

EXAMPLE III

A catalyst prepared according to Example II had the composition 89.2. $ZnO.Al_2O_3$—$10.8MoO_3$. This catalyst, when used to upgrade a 150–250° F. West Texas at 50 p. s. i. pressure, 2/1 $H_2$/naphtha mol ratio, 950° F. and a 1.2 liquid volumes per catalyst volume per hour, gave a 90 volume per cent of $C_4^+$ gasoline having a CFR-research octane number of 84. Under the same test conditions, catalyst C of Example 1 gave a gasoline having only an 82.5 research octane number. The catalyst of this invention formed 1.3 wt. per cent coke at the 84 octane number level. Catalyst C at the same octane number level gave 1.4 wt. per cent coke.

Excellent catalysts can also be made, according to the invention for hydrogenation, dehydrogenation, desulfurization and similar reactions.

EXAMPLE IV

A hydrogenation-dehydrogenation catalyst of superior quality is prepared by dissolving nickel oxide in a sufficient amount of concentrated ammonium hydroxide to form the complex ion, $Ni(NH_4)_4^{++}$. This solution is then slurried with a commercially available activated alumina for 3 hours at room temperature. The mixture is then dried for 8 hours at 250° F. and heated in air for 3 hours at 1150° F. The composition of the catalyst is 10% NiO—90% $Al_2O_3$.

EXAMPLE V

A mild hydrogenation catalyst having the composition 39% CuO, 29% $Cr_2O_3$ and 32% ZnO by weight is prepared by precipitating copper oxide from a copper sulfate solution with ammonium hydroxide. After washing the precipitate free from sulfate, it is mixed with commercially available zinc oxide in proper proportions and the mixture is dissolved in a minimum amount of concentrated ammonium hydroxide to form a solution of the complexes of the oxides or hydroxides. Chromic acid anhydride is dissolved in water and reduced with sulfur dioxide. The hydrated oxide of chromium is precipitated by bubbling ammonia gas through the solution. After washing the precipitate, it is slurried with the solution of complexes and dried at 150° F. This catalyst has superior characteristics for the hydrogenation of unsaturates, esters, aldehydes, etc.

Although in the above description and examples special emphasis has been placed on catalysts which are suitable for reforming, hydrogenation and dehydrogenation, the invention is not limited thereto. The advantages of employing the method of the invention are obtained with catalysts for various reactions including oxidation, polymerization, cycloversion, hydrocarbon synthesis, dehydro-polymerization, hydrocracking, desulfurization, etc.

The foregoing description contains a limited number of embodiments of the present invention. It will be understood that numerous variations are possible without departing from the scope of the following claims.

What is claimed is:

1. In the preparation of hydrocarbon conversion catalysts the steps which comprise treating zinc oxide with ammonium hydroxide to form a zinc oxide-ammonia complex, combining said complex with aluminum hydroxide, adding a solution of a catalytic metal oxide selected from the group consisting of $Cr_2O_3$, $W_2O_3$, $MoO_3$ and $V_2O_3$ thereto, drying and heating the resultant mixture.

2. In the preparation of hydrocarbon conversion catalysts the steps which comprise slurrying zinc oxide and aluminum oxide in ammonium hydroxide to form a zinc oxide ammonia complex-aluminum oxide slurry, adding a solution of a catalytic metal oxide selected from the group consisting of $Cr_2O_3$, $W_2O_3$, $MoO_3$ and $V_2O_3$ thereto, drying and heating the resultant mixture.

3. In the preparation of hydrocarbon conversion catalysts the steps which comprise treating a solution of a zinc salt with ammonium hydroxide to precipitate zinc hydroxide, washing the zinc hydroxide precipitate, treating a solution of an aluminum salt with ammonium hydroxide to precipitate aluminum hydroxide, washing the aluminum hydroxide precipitate, slurrying the washed precipitates in ammonium hydroxide to form a zinc oxide ammonia-complex-aluminum hydroxide slurry, adding a solution of a catalytic metal oxide selected from the group consisting of $Cr_2O_3$, $W_2O_3$, $MoO_3$ and $V_2O_3$ to said slurry, drying and heating the resultant mixture.

4. In the preparation of hydrocarbon conversion catalysts the steps which comprise treating a solution of a zinc salt with ammonium hydroxide to precipitate zinc hydroxide, washing the zinc hydroxide precipitate, treating a solution of an aluminum salt with ammonium hydroxide to precipitate aluminum hydroxide, washing the aluminum hydroxide precipitate, slurrying the washed precipitates in ammonium hydroxide to form a zinc oxide ammonia complex-aluminum hydroxide slurry, adding ammonium molybdate to said slurry, drying and heating the resultant mixture.

5. In the preparation of hydrocarbon conversion catalysts the steps which comprise treating a solution of a zinc salt with ammonium hydroxide to precipitate zinc hydroxide, washing the zinc hydroxide precipitate, treating a solution of an aluminum salt with ammonium hydroxide to precipitate aluminum hydroxide, washing the aluminum hydroxide precipitate, slurrying the washed precipitates in ammonium hydroxide to form a zinc oxide ammonia complex-aluminum hydroxide slurry, adding ammonium chromate to said slurry, drying and heating the resultant mixture.

6. A method of treating hydrocarbons boiling in the motor fuel range which comprises contacting them under reforming conversion conditions with catalysts prepared by treating zinc oxide with ammonium hydroxide to form a zinc oxide-ammonia complex, combining said complex with aluminum hydroxide, adding a solution of a catalytic metal oxide selected from the group consisting of $Cr_2O_3$, $W_2O_3$, $MoO_3$ and $V_2O_3$ thereto, drying and heating the resultant mixture.

7. A method of treating hydrocarbons boiling in the motor fuel range which comprises contacting them under reforming conversion conditions with catalysts prepared by slurrying zinc oxide and aluminum oxide in ammonium hydroxide to form a zinc oxide ammonia complex-aluminum oxide slurry, adding a solution of a catalytic metal oxide selected from the group consisting of $Cr_2O_3$, $W_2O_3$, $MoO_3$ and $V_2O_3$ thereto, drying and heating the resultant mixture.

8. A method of treating hydrocarbons boiling in the motor fuel range which comprises contacting them under reforming conversion conditions with catalysts prepared by treating a solution of a zinc salt with ammonium hydroxide to precipitate zinc hydroxide, washing the zinc hydroxide precipitate, treating a solution of an aluminum salt with ammonium hydroxide to precipitate aluminum hydroxide, washing the aluminum hydroxide precipitate, slurrying the washed precipitates in ammonium hydroxide to form a zinc oxide ammonia complex-aluminum hydroxide slurry, adding a solution of a catalytic metal oxide selected from the group consisting of $Cr_2O_3$, $W_2O_3$, $MoO_3$ and $V_2O_3$ to said slurry, drying and heating the resultant mixture.

References Cited in the file of this patent

UNITED STATES PATENTS

| Number | Name | Date |
|---|---|---|
| 1,956,585 | Oglesby et al. | May 1, 1934 |
| 2,162,276 | Weiss | June 13, 1939 |
| 2,371,087 | Webb et al. | Mar. 6, 1948 |
| 2,447,016 | Kearby | Aug. 17, 1948 |
| 2,459,480 | Welty et al. | Jan. 18, 1949 |
| 2,486,361 | Nahin et al. | Oct. 25, 1949 |